(12) United States Patent
Frantz et al.

(10) Patent No.: US 12,411,819 B2
(45) Date of Patent: Sep. 9, 2025

(54) CREATING ACCESSIBLE MODEL DATA SETS

(71) Applicant: SIGMA COMPUTING, INC., San Francisco, CA (US)

(72) Inventors: Jason D. Frantz, San Francisco, CA (US); Max H. Seiden, San Francisco, CA (US); Donald Huang, San Francisco, CA (US); Stipo Josipovic, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 16/922,213

(22) Filed: Jul. 7, 2020

(65) Prior Publication Data
US 2021/0256001 A1 Aug. 19, 2021

Related U.S. Application Data

(60) Provisional application No. 62/978,084, filed on Feb. 18, 2020.

(51) Int. Cl.
*G06F 16/21* (2019.01)
*G06F 16/22* (2019.01)
*G06F 16/2457* (2019.01)
*G06F 16/28* (2019.01)

(52) U.S. Cl.
CPC ........ *G06F 16/212* (2019.01); *G06F 16/2282* (2019.01); *G06F 16/24573* (2019.01); *G06F 16/283* (2019.01)

(58) Field of Classification Search
CPC ............. G06F 16/212; G06F 16/24573; G06F 16/2282; G06F 16/283; G06F 16/245; G06F 16/254; G06F 16/2445; G06F 16/2393
See application file for complete search history.

(56) References Cited

U.S. PATENT DOCUMENTS

| | | | |
|---|---|---|---|
| 9,959,098 B1 * | 5/2018 | Smith Devine | G06F 40/18 |
| 10,133,797 B1 * | 11/2018 | Mishra | G06F 16/254 |
| 11,086,894 B1 * | 8/2021 | Srivastava | G06F 16/248 |
| 2003/0110191 A1 * | 6/2003 | Handsaker | G06F 40/18 715/213 |
| 2006/0010118 A1 * | 1/2006 | Sattler | G06F 16/20 |
| 2007/0168323 A1 * | 7/2007 | Dickerman | G06F 40/18 |
| 2009/0235154 A1 * | 9/2009 | Khen | H04L 67/133 715/219 |
| 2011/0055231 A1 | 3/2011 | Huck et al. | |

(Continued)

OTHER PUBLICATIONS

International Search Report and Written Opinion, PCT/US2021/018349, May 31, 2021, 10 pages.

*Primary Examiner* — William P Bartlett

(57) ABSTRACT

Creating accessible model data sets including receiving, by a query manager via a spreadsheet interface, an instruction to create a model data set using a data source from a data warehouse, wherein the model data set is a reusable modeling layer comprising at least a portion of the data source; building, by the query manager using the instruction to create the model data set, a first query statement comprising instructions to generate the model data set from the portion of the data source; and storing, by the query manager, the first query statement in a schema storage location within the data warehouse.

17 Claims, 6 Drawing Sheets

(56) References Cited

U.S. PATENT DOCUMENTS

| | | | |
|---|---|---|---|
| 2013/0097114 A1* | 4/2013 | Burke | G06F 16/2452 |
| | | | 707/769 |
| 2013/0124957 A1* | 5/2013 | Oppenheimer | G06F 40/18 |
| | | | 715/212 |
| 2013/0311456 A1* | 11/2013 | Winkler | G06F 16/24578 |
| | | | 707/723 |
| 2016/0019281 A1 | 1/2016 | Hariharan et al. | |
| 2016/0104002 A1* | 4/2016 | Schneider | H04L 63/102 |
| | | | 726/1 |
| 2018/0295194 A1* | 10/2018 | Deraz | H04L 67/51 |
| 2019/0370321 A1* | 12/2019 | Bisceglie | G06F 16/176 |
| 2020/0349320 A1* | 11/2020 | Owens | G06F 16/86 |
| 2020/0364222 A1* | 11/2020 | Sarapuk | G06F 16/24539 |
| 2021/0019318 A1* | 1/2021 | Leung | G06F 16/24537 |
| 2021/0165782 A1* | 6/2021 | Deshpande | G06F 16/2445 |
| 2021/0342526 A1* | 11/2021 | Rautenbach | G06F 16/2358 |

\* cited by examiner

CREATING ACCESSIBLE MODEL DATA SETS

CROSS-REFERENCE TO RELATED APPLICATION

This application is a non-provisional application for patent entitled to a filing date and claiming the benefit of earlier-filed U.S. Provisional Patent Application Ser. No. 62/978,084, filed Feb. 18, 2020.

BACKGROUND

Field of the Invention

The field of the invention is data processing, or, more specifically, methods, apparatus, and products for creating accessible model data sets.

Description of Related Art

Modern businesses may store large amounts of data in remote databases within cloud-based data warehouses. This data may be accessed using database query languages, such as structured query language (SQL). However, constructing complex database query statements is difficult for most users. Further, frequent database requests may be computationally and financially expensive.

SUMMARY

Methods, systems, and apparatus for creating accessible model data sets. Creating accessible model data sets includes receiving, by a query manager via a spreadsheet interface, an instruction to create a model data set using a data source from a data warehouse, wherein the model data set is a reusable modeling layer comprising at least a portion of the data source; building, by the query manager using the instruction to create the model data set, a first query statement comprising instructions to generate the model data set from the portion of the data source; and storing, by the query manager, the first query statement in a schema storage location within the data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
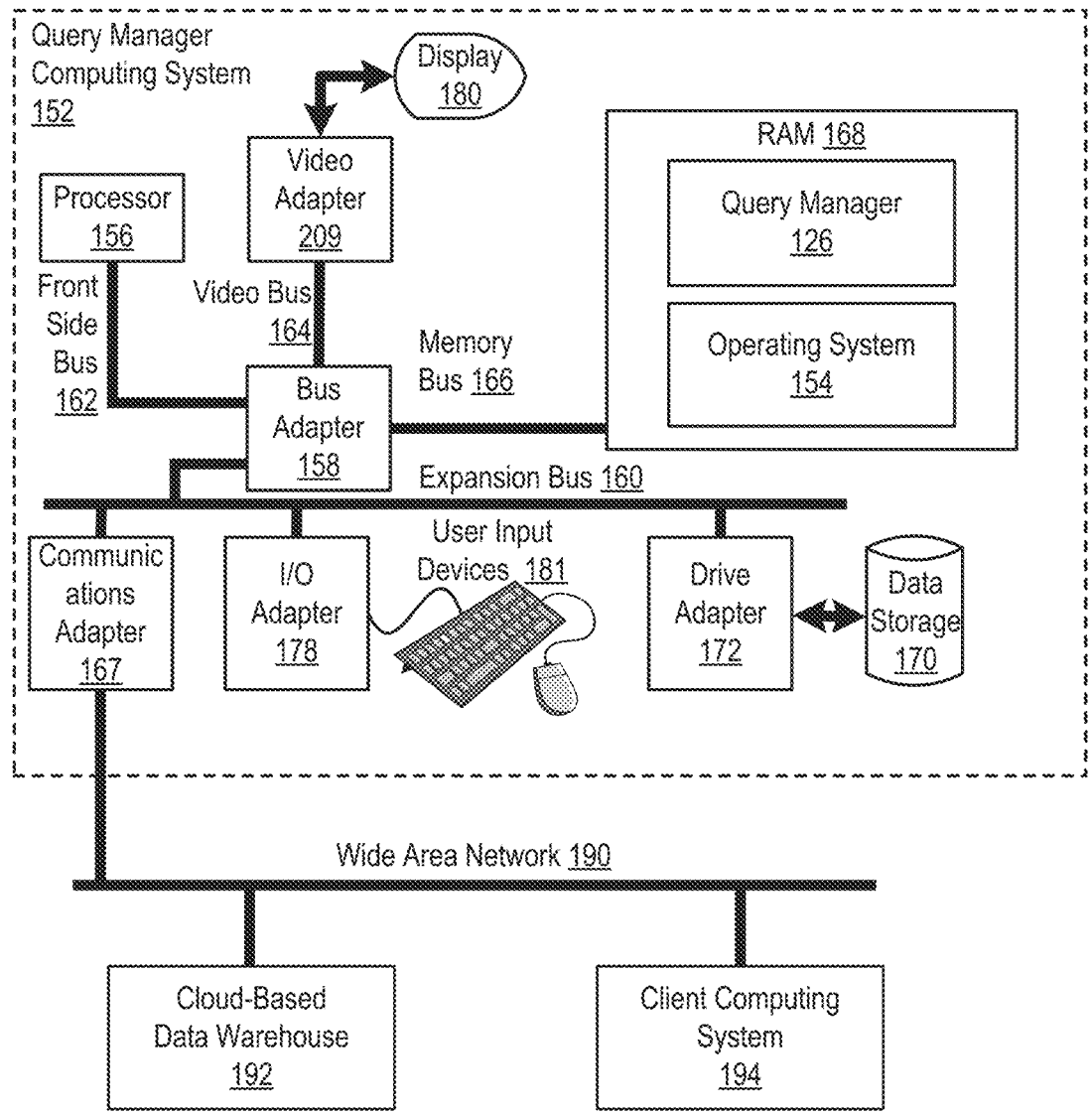
FIG. 1 sets forth a block diagram of an example system configured for creating accessible model data sets according to embodiments of the present invention.

Exemplary methods, apparatus, and products for creating accessible model data sets in accordance with the present invention are described with reference to the accompanying drawings, beginning with FIG. 1. FIG. 1 sets forth a block diagram of automated computing machinery comprising an exemplary computing system (152) configured for creating accessible model data sets according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for creating accessible model data sets according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the query manager (126), a module for creating accessible model data sets according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for creating accessible model data sets according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for creating accessible model data sets according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the query manager (126) on the computing system (152).

Figure 2:
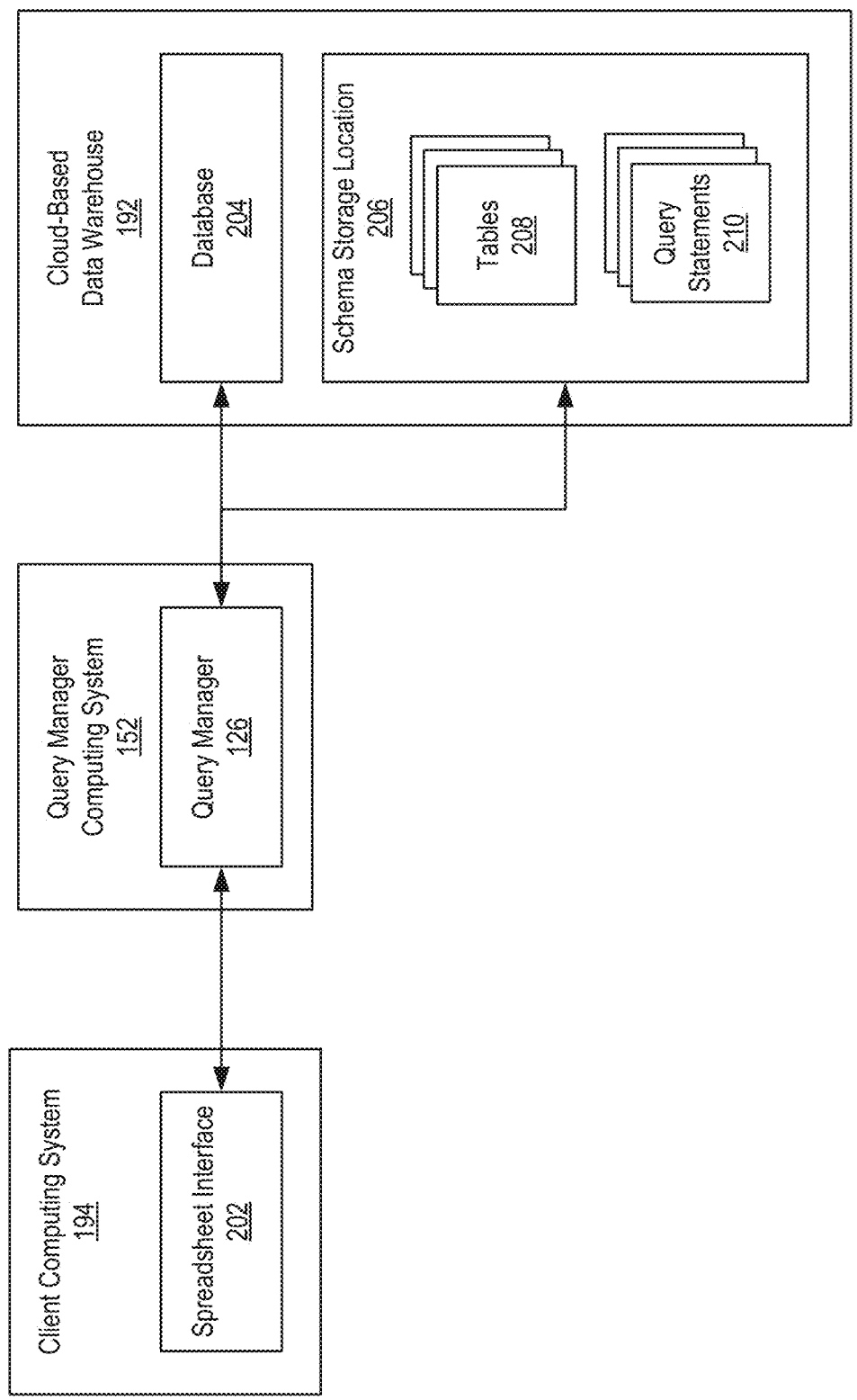
FIG. 2 sets forth a block diagram of an example system configured for creating accessible model data sets according to embodiments of the present invention.

FIG. 2 shows an exemplary system for creating accessible model data sets according to embodiments of the present invention. As shown in FIG. 2, the system includes a client computing system (194), a query manager computing system (152), and a cloud-based data warehouse (192). The client computing system (194) includes a spreadsheet interface (202). The query manager computing system (152) includes a query manager (126). The cloud-based data warehouse (192) includes a database (204) and a schema storage location (206). The schema storage location (206) includes tables (208) and query statements (210).

The spreadsheet interface (202) is a visual presentation configured to present worksheets to a user. A worksheet is a presentation of data from one or more data sources. Such data sources may include data sources from a database (204) or other worksheets. The spreadsheet interface (202) also receives requests from a user (via a user account) for data from the database (204). The spreadsheet interface (202) may be presented, in part, by the query manager (126) and displayed on a client computing system (194) (e.g., on a system display or mobile touchscreen). The spreadsheet interface (202) may be part of an Internet application that includes the query manager (126) and is hosted on the query manager computing system (152).

The cloud-based data warehouse (192) hosts the database (204). The database (204) is a collection of data sources and a management system for the data. A data source is a collection of related data on the database (204). Examples of data sources include tables, schemas, and folders. Data from the data sources may be organized into columns and rows. The particular columns, rows, and organization of the columns and rows that make up data may be specified in the query statement requesting the data.

The query manager (126) may be a client of the database (204) without heighted access permissions. Specifically, the query manager (126) may not be authorized to make changes to the database (204) and be limited to database queries for data from the data sources on the database. The database (204) may be editable primarily by a database administrator or by applications authorized by the database administrator to edit the database (204). Changes to the database (204) may be closely managed, and most users and entities, including a user of the client computing system (194) and the query manager (126), may be limited to read-only access to the database (204) and the data sources within the database (204).

However, a database administrator may grant a query manager (126) read and write access to a schema storage location (206) isolated from the rest of the database (204). The schema storage location (206) is a storage location on the cloud-based data warehouse (192) to which the query manager (126) has read and write access. The query manager (126) may only have read-only access to the remainder of the cloud-based data warehouse (192), including the data in a database table.

The query manager (126) is hardware, software, or an aggregation of hardware and software configured to receive requests from the client computing system (194), via the spreadsheet interface (202). The query manager (126) is also configured to generate database queries in response to requests for data and manipulations of that data via the spreadsheet interface in the spreadsheet interface (202). The query manager (126) may be part of a query statement generator that generates the query statement.

The query manager (126) presents, via the spreadsheet interface (202), a worksheet using the information in the worksheet metadata. Worksheet metadata is data that describes a worksheet. Specifically, the worksheet metadata may include a description of the data sources and a worksheet architecture. Worksheets are presented by generating a query statement using the description of the data sources in the worksheet metadata. Once the results of the query statement are received, the received data is arranged according to the worksheet architecture. The description of the data sources describes which data is to be requested via the query statement or retrieved from another worksheet. The description of the data sources may include which columns and rows of data from the data source are to be retrieved from the database (204) via the query statement. The data presented in the worksheet may be referred to as the underlying data (i.e., the data upon which the worksheet is created).

The worksheet architecture includes the functions to be applied to the data and the presentation structure of the data. The functions to be applied to the data may include the manipulations of the data in the columns and rows received from the data source. Such manipulations may include calculation columns that apply a function to data from the data source. The presentation structure of the data may include presentation selections made by a user. The presentation structure may include, for example, the hierarchical relationship between the columns, filters applied to the data, and the manner in which the data is sorted. The presentation structure of the data may also include the visibility of a particular subset of the data. Visibility may be altered based on filter settings of the data or on the visibility status (e.g., hidden or not hidden) of a column within the data. The presentation structure of the data may also include the formatting of the worksheet, such as the size of rows and columns.

A model data set may be generated as a particular type of worksheet. A model data set is collection, composition, and organization of data that provides a single source of truth for that data. Further, the model data set is a reusable modeling layer that may be used as an input data source for other worksheets. The model data set may also be referred to as a semantic modeling layer. As with worksheet metadata, modeling data set metadata is data that describes a model data set. Also, as with worksheet metadata, the model data set metadata includes a description of the data sources and a worksheet architecture.

Worksheets that utilize a model data set as a data source are referred to as dependent worksheets. A dependent worksheet may be configured to perform analysis on the portion of the data source within the model data set without changing the model data set. Specifically, the dependent worksheet may include, or have added, elements that use data in the model data set as inputs for analysis on that data. The dependent worksheet may also include other data sources to combine with the model data set. These additional data sources may include an additional model data set. While dependent worksheets utilize a model data set as a data source, the model data set is not alterable via a dependent worksheet. In other words, each dependent worksheet accesses the model data set as a read-only artifact.

As an example, consider a regional branch of a sales business that wants to provide a model data set describing the sales accounts for all salespeople to use. The head of the sales department may generate the model data set that includes a contact person for each client, contact details for the contact person, and aggregated sales information based on total sales in the business's region. This model data set may use, as input data sources, different tables from a database on a cloud-based data warehouse. Specifically, the model data set may use as accounts contact table and a sales table as data sources. The head of sales generates the model data set using the spreadsheet interface of the spreadsheet interface (202). The head of sales also includes a calculation column that displays an aggregated sales total for each client over the last 12 months.

Continuing with the example, each salesperson is provided an identifier of the model data set. Using their own accounts, each salesperson creates a new worksheet using the model data set as a data source. The new worksheet allows each salesperson to perform their own analysis on the model data set. The model data set is provided to each salesperson in a view mode that prevents destructive edits to the model data set and allows additive edits to the model data set within the new worksheet.

Continuing with the example, assume that one salesperson is tasked with contacting the top five clients based on the aggregated sales total for the last 12 months, and another salesperson is tasked with the bottom five clients based on the aggregated sales total for the last 12 months. Because both salespeople are using the same model data set that calculates and presents the aggregated sales data in the same manner, both can be assured that their sources of information (the aggregated sales data) are the same. Subsequently each salesperson may perform their individual analysis on the model data set within their own worksheets.

The query manager (126) may generate and store query statements (210) on the schema storage location (206) to reduce the traffic and computational overhead of complex query statements used to generate model data sets and other worksheets. The query manager (126) may store at least two types of query statements. The first type of query statement targets the data sources in the database (204) to generate a table. This first type of query statement enables third-party applications (i.e., applications other than the query manager (126) that access the data warehouse (192) directly) to retrieve a model data set or other worksheet without going through the query manager (126). The first type of query statement may be updated as changes are made to the model data set through the query manager (126).

The second type of query statement stored within the schema storage location (206) may enable third-party applications to access tables (208) stored within the schema storage location (206). The query manager (126) may store a model data set or other worksheet as tables (208) in the schema storage location (206). Frequently used tables (208) are stored in the schema storage location (206) to reduce the overhead of generating the table using a query statement issued to the database (204) each time one of the tables (208) is requested for presentation within the spreadsheet interface (202). Rather, when the table is requested, the query generator (126) retrieves the pre-existing table from the schema storage location (206), reducing the computation overhead required to create the table from the data source using a query statement. Because the tables (208) within the schema storage location (206) do not include live data from the database (204), the tables (208) are updated periodically based on a user setting.

The table may be generated and stored such that the table does not conform to a standard query language. Specifically, the tables (208) may not be invokable using SQL or another standard database query language. Instead, the tables (208) may be generated and stored in a format specific to the query manager (126). While the query manager (126) is able to retrieve the table from the schema storage location (206), other third-party applications using standard query languages to access the schema storage location (206) are not able to utilize the table directly.

To enable third-party applications using standard query languages to access the table within the schema storage location (206), the query manager (126) may generate the second type of query statement targeting the table in the schema storage location (206). The query manager (126) may then store the query statement within the schema storage location (206). Third-party applications may invoke query statements (210) within the schema storage location (206) to retrieve the tables (208) within the schema storage location (206) while avoiding the overhead associated with generating the table directly from the database (204). As the tables (208) are updated, so are the query statements (210) that target the tables (208).

Figure 3:
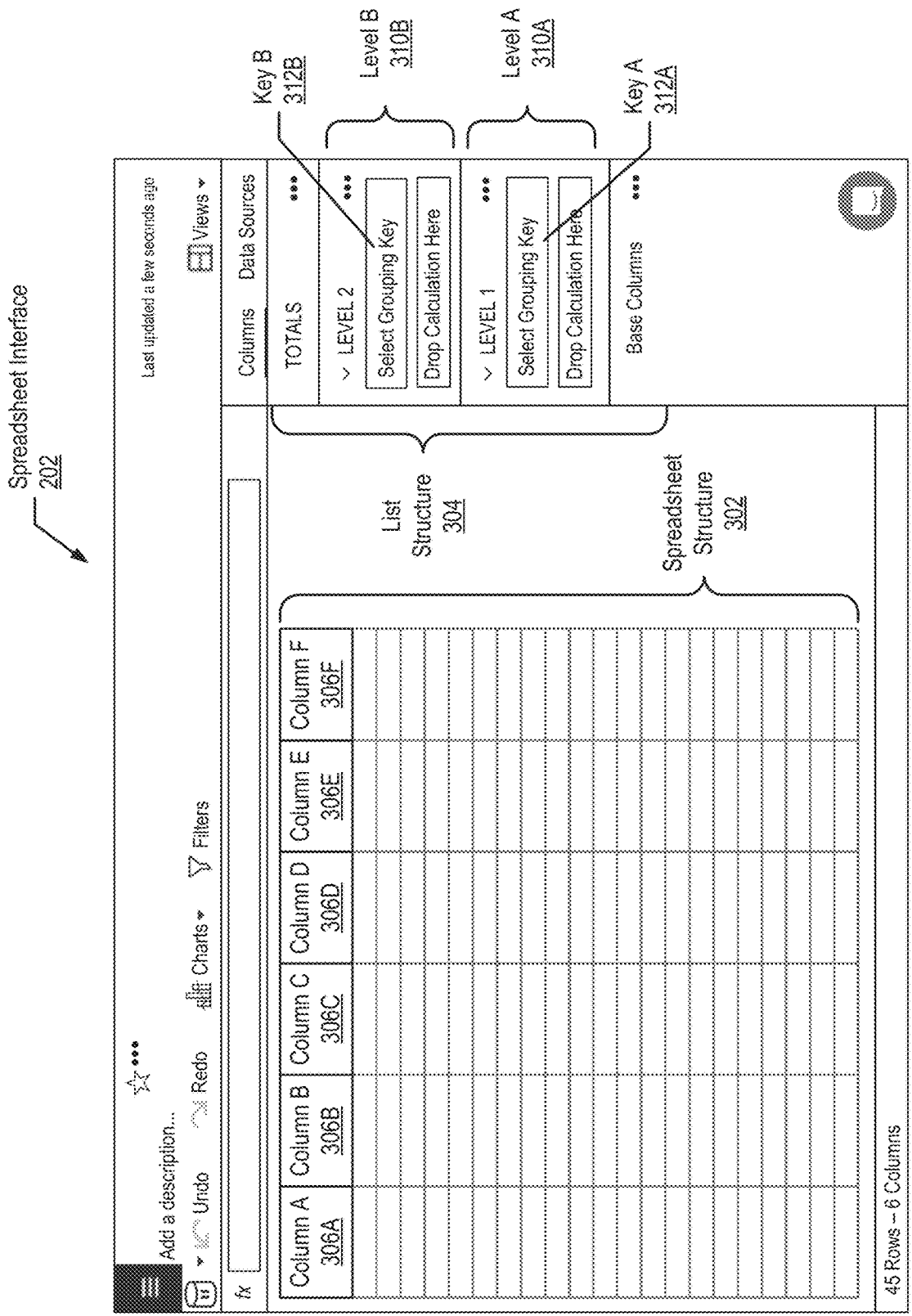
FIG. 3 sets forth a block diagram of an example system configured for creating accessible model data sets according to embodiments of the present invention.

FIG. 3 shows an exemplary system for creating accessible model data sets according to embodiments of the present invention. As shown in FIG. 3, the exemplary spreadsheet interface (202) includes a spreadsheet structure (302) and a list structure (304). The spreadsheet structure (302) includes a worksheet (shown as empty rows) with six columns (column A (306A), column B (306B), column C (306C), column D (306D), column E (306E), column F (306F)). The spreadsheet interface (202) receives input from a user and generates a worksheet. The generated worksheet may be a model data set.

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level (level A (310A), level B (310B)) within the list structure (304) is a position within a hierarchical relationship between columns (column A (306A), column B (306B), column C (306C), column D (306D), column E (306E), column F (306F)). The keys (key A (312A), key B (312B)) within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The spreadsheet interface (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The spreadsheet interface (202) may also include a mechanism for a user to request data from a database to be presented as a worksheet in the spreadsheet interface (202). Such a mechanism may be part of the interactivity of the worksheet. Specifically, a user may manipulate a worksheet (e.g., by dragging and dropping columns or rows, resorting columns or rows, etc.) and, in response, the spreadsheet interface (202) may generate request (e.g., in the form of a state specification) for data and send the request to the data analyzer (126). Such a mechanism may also include a direct identification of the rows and columns of a database data set that a user would like to access (e.g., via a selection of the rows and columns in a dialog box).

Figure 4:
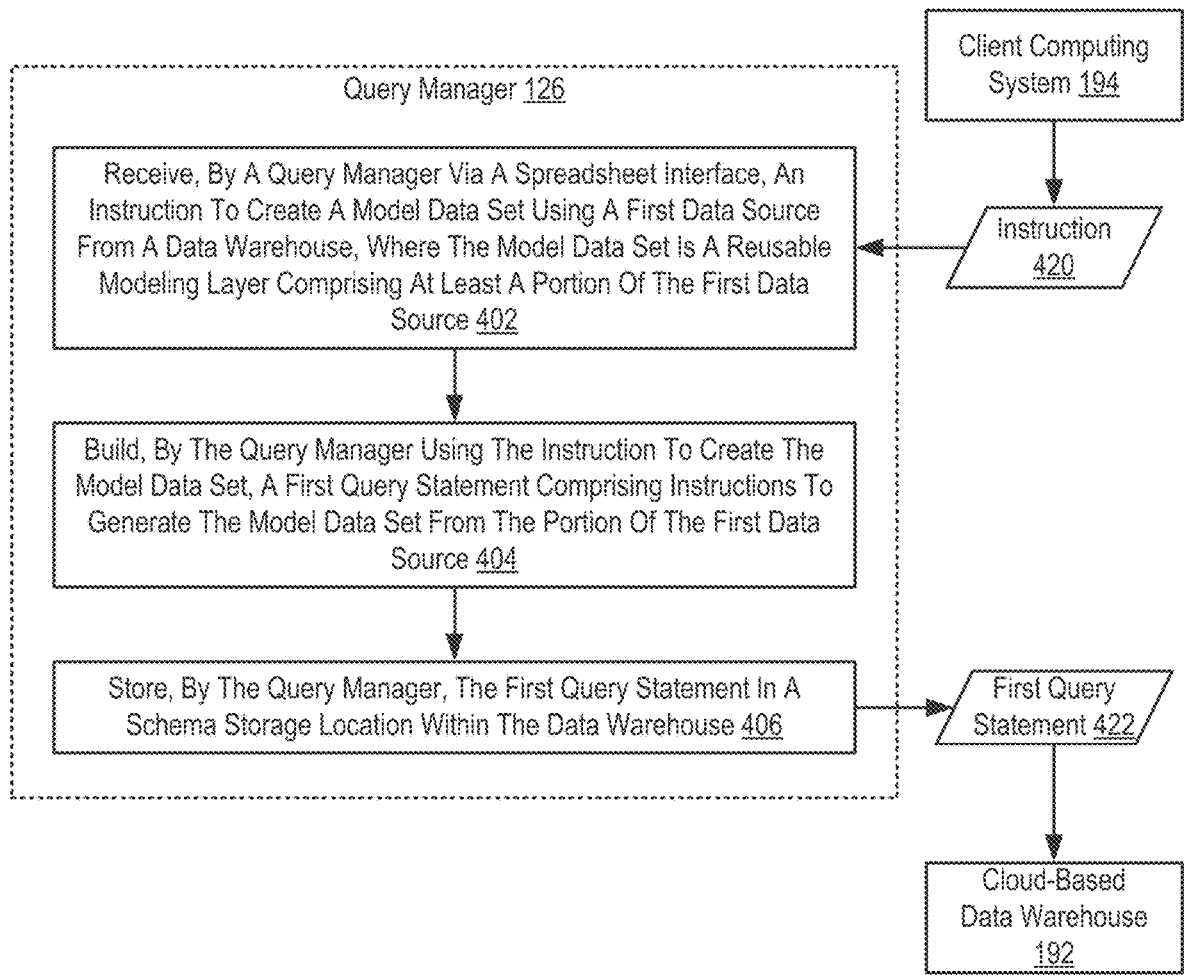
FIG. 4 sets forth a flow chart illustrating an exemplary method for creating accessible model data sets according to embodiments of the present invention.

For further explanation, FIG. 4 sets forth a flow chart illustrating an exemplary method for creating accessible model data sets according to embodiments of the present invention that includes receiving (402), by a query manager (126) via a spreadsheet interface, an instruction (420) to create a model data set using a data source from a data warehouse (192), wherein the model data set is a reusable modeling layer comprising at least a portion of the data source. Receiving (402), by a query manager (126) via a spreadsheet interface, an instruction (420) to create a model data set using a data source from a data warehouse (192), wherein the model data set is a reusable modeling layer comprising at least a portion of the data source may be carried out by the query manager (126) using the instruction (420) from the client computing system (194) to generate model data set metadata using the data source. The instruction may include modifications to a table from the database on the data warehouse (192). Such modifications may include, for example, a join with another data source (such as a table), the addition or exclusion of one or more columns, and a calculation column added to the table.

The method of FIG. 4 further includes building (404), by the query manager (126) using the instruction to create the model data set, a first query statement (422) comprising instructions to generate the model data set from the portion of the data source. Building (404), by the query manager (126) using the instruction to create the model data set, a first query statement (422) comprising instructions to generate the model data set from the portion of the data source may be carried out by the query manager (126) generating a standard query language statement that, when issued to a database, will result in a response from the database that includes the generated model data set. The instruction to create the model data set may first be converted into a model data set metadata and stored locally to the query manager (126) before being used to generate the first query statement (422). The first query statement (422) may be written in a standard database query language, such as SQL. For example, the first query statement (422) may be an SQL view request.

The method of FIG. 4 further includes storing (406), by the query manager (126), the first query statement (422) in a schema storage location within the data warehouse (192). Storing (406), by the query manager (126), the first query statement (422) in a schema storage location within the data warehouse (192) may be carried out by the query manager (126) accessing the schema storage location within the data warehouse (192) and storing the first query statement (422) in a location accessible by third-party applications. The first query statement (422) within the schema storage location in the data warehouse (192) may be invokable by a SQL statement. Specifically, the first query statement (422) may be executed in response to receiving an SQL statement from the query manager (126) or a third-party application with access to the schema storage location.

The above features improve the operation of the computer system by providing a mechanism (the query manager) to create and modify model data sets using data sources in a database. The above features further improve the operation of the computer system by enabling access to the model data sets by third-party applications. This is accomplished by storing the model data set as a query statement in a schema storage location on the data warehouse and making the query statement invokable by third-party applications.

Figure 5:
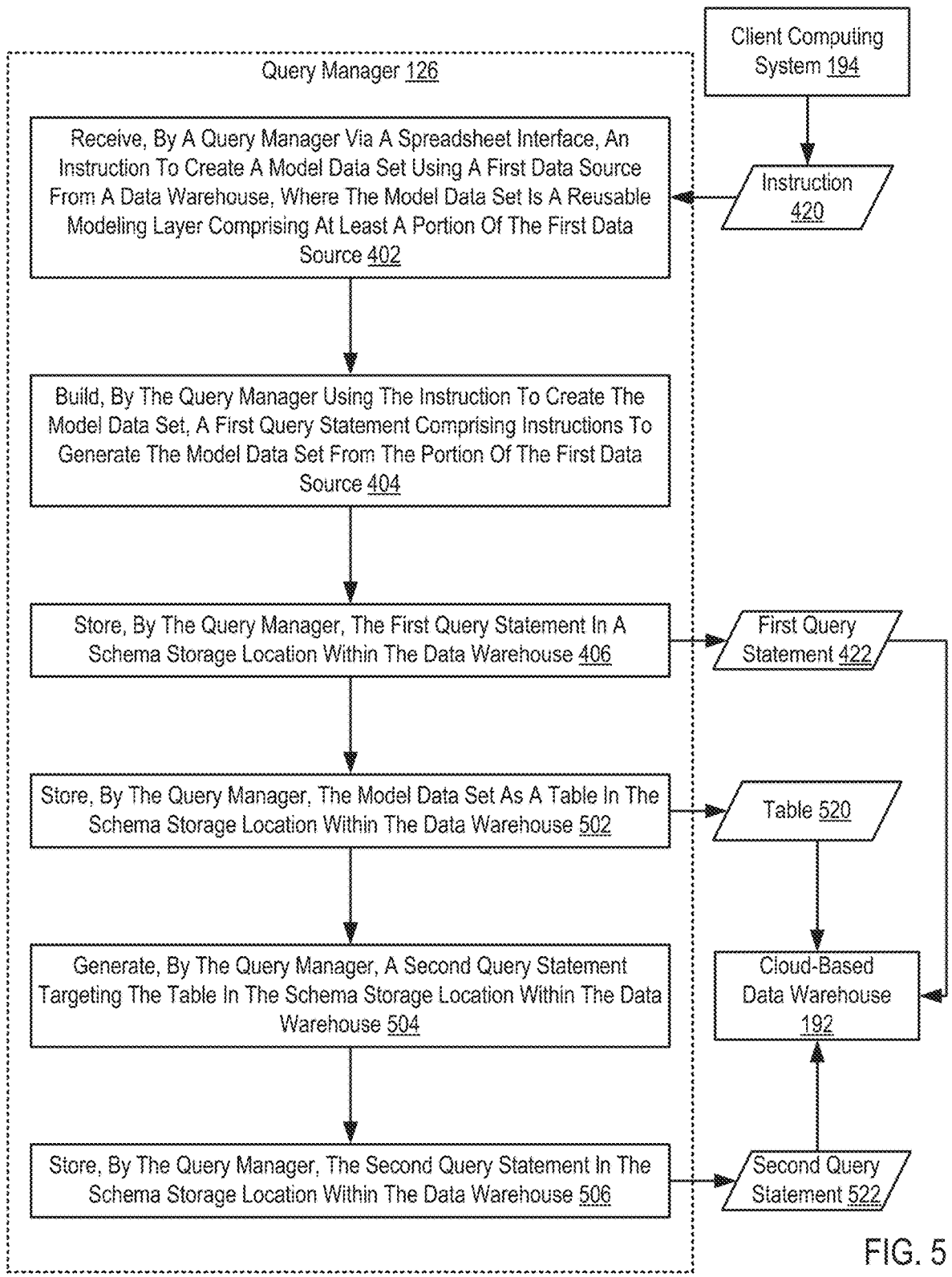
FIG. 5 sets forth a flow chart illustrating an exemplary method for creating accessible model data sets according to embodiments of the present invention.

For further explanation, FIG. 5 sets forth a flow chart illustrating a further exemplary method for creating accessible model data sets according to embodiments of the present invention that includes receiving (402), by a query manager (126) via a spreadsheet interface, an instruction (420) to create a model data set using a data source from a data warehouse (192), wherein the model data set is a reusable modeling layer comprising at least a portion of the data source; building (404), by the query manager (126) using the instruction to create the model data set, a first query statement (422) comprising instructions to generate the model data set from the portion of the data source; and storing (406), by the query manager (126), the first query statement (422) in a schema storage location within the data warehouse (192).

The method of FIG. 5 differs from the method of FIG. 4, however, in that the method of FIG. 5 further includes storing (502), by the query manager (126), the model data set as a table (520) in the schema storage location within the data warehouse (192). Storing (502), by the query manager (126), the model data set as a table (520) in the schema storage location within the data warehouse (192) may be carried out by the query manager (126) generating the table using the metadata for the model data set as well as the retrieved data from the data source. Once the table is generated, the query manager (126) stores the table in the schema storage location within the data warehouse (192). The table may be in a format specific to the query manager (126). Specifically, the table may be in a format that is not retrievable or invokable by standard database query languages, such as SQL.

Because the table does not include live data from the database, the table is periodically updated to reflect any changes made to the data source within the database. The frequency of the updates may depend on a user preference balancing the cost of queries to the database with tolerance for stale data in the table in the schema storage location within the data warehouse (192). Updates to the table may be performed by generating a new table in the schema storage location within the data warehouse (192) using the current data source in the database. The previous table may then be deleted. Once the new table is created, any query statements targeting the previous table must be updated to target the new table.

The method of FIG. 5 further includes generating (504), by the query manager (126), a second query statement (522) targeting the table (520) in the schema storage location within the data warehouse (192). Generating (504), by the query manager (126), a second query statement (522) targeting the table (520) in the schema storage location within the data warehouse (192) may be carried out by the query manager (126) creating the second query statement (522) that invokes the table (520) using a mix of standard database query statements and statements specific to the query manager (126) and table. Specifically, the second query statement (522) may include references to the table that do not abide by syntax rules for standard database query statements.

The method of FIG. 5 further includes storing (506), by the query manager (126), the second query statement (522) in the schema storage location within the data warehouse (192). Storing (506), by the query manager (126), the second query statement (522) in the schema storage location within the data warehouse (192) may be carried out by the query manager (126) accessing the schema storage location within the data warehouse (192) and storing the second query statement (522) in a location accessible by third-party applications.

Figure 6:
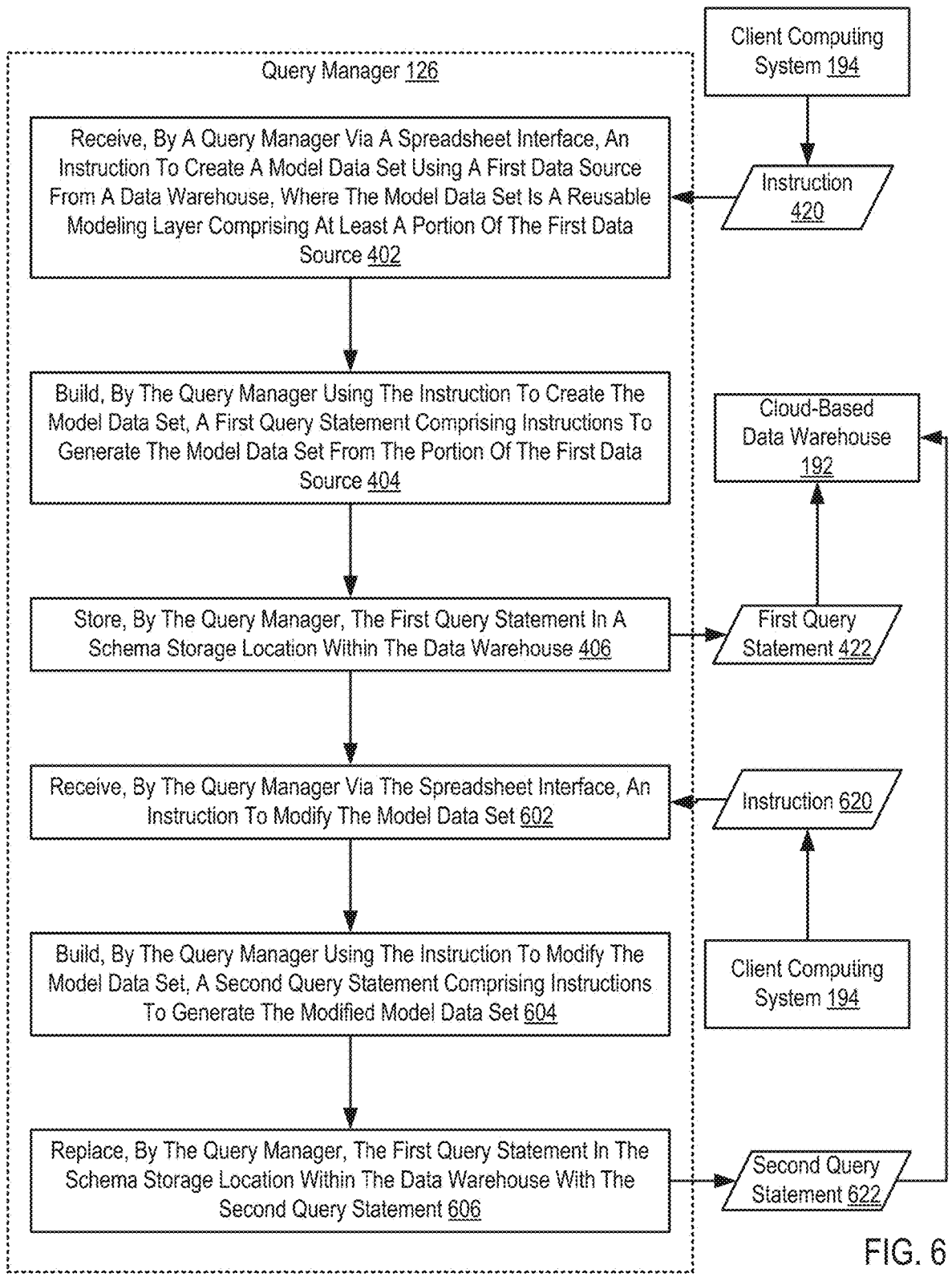
FIG. 6 sets forth a flow chart illustrating an exemplary method for creating accessible model data sets according to embodiments of the present invention.

For further explanation, FIG. 6 sets forth a flow chart illustrating a further exemplary method for creating accessible model data sets according to embodiments of the present invention that includes receiving (402), by a query manager (126) via a spreadsheet interface, an instruction (420) to create a model data set using a data source from a data warehouse (192), wherein the model data set is a reusable modeling layer comprising at least a portion of the data source; building (404), by the query manager (126) using the instruction to create the model data set, a first query statement (422) comprising instructions to generate the model data set from the portion of the data source; and storing (406), by the query manager (126), the first query statement (422) in a schema storage location within the data warehouse (192).

The method of FIG. 6 differs from the method of FIG. 4, however, in that the method of FIG. 6 further includes receiving (602), by the query manager (126) via the spreadsheet interface, an instruction (620) to modify the model data set. Receiving (602), by the query manager (126) via the spreadsheet interface, an instruction (620) to modify the model data set may be carried out by the query manager (126) presenting the model data set to a user and detecting that the user has made an alteration to the model data set via the spreadsheet interface. The modification may include, for example, the addition of a data source via a join, adding or excluding a column, or creating a calculation column.

The method of FIG. 6 further includes building (604), by the query manager (126) using the instruction to modify the model data set, a second query statement (622) comprising instructions to generate the modified model data set. Building (604), by the query manager (126) using the instruction to modify the model data set, a second query statement (622) comprising instructions to generate the modified model data set may be carried out by the query manager (126) generating a standard query language statement that, when issued to a database, will result in a response from the database that includes the generated modified model data set. The instruction to modify the model data set may first be converted into changes to the model data set metadata and stored locally to the query manager (126) before being used to generate the second query statement (622). The second query statement (622) may be written in a standard database query language, such as SQL. For example, the second query statement (622) may be an SQL view request.

The method of FIG. 6 further includes replacing (606), by the query manager, the first query statement in the schema storage location within the data warehouse (192) with the second query statement (622). Replacing (606), by the query manager, the first query statement in the schema storage location within the data warehouse (192) with the second query statement (622) may be carried out by the query manager (126) accessing the schema storage location within the data warehouse (192), deleting the first query statement (422), and storing the second query statement (622) in the same location accessible by third-party applications.

In view of the explanations set forth above, readers will recognize that the benefits of creating accessible model data sets according to embodiments of the present invention include:

Improving the operation of a computing system by providing a mechanism to create and modify model data sets using data sources in a database, increasing computing system usability and functionality.

Improving the operation of a computing system by enabling access to the model data sets by third-party applications, increasing computing system efficiency and functionality.

Exemplary embodiments of the present invention are described largely in the context of a fully functional computer system for creating accessible model data sets. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of creating accessible model data set worksheets, the method comprising:
receiving, by a query manager via a spreadsheet interface, an instruction to create a model data set worksheet using a data source from a database within a data warehouse, wherein the query manager is included in a computing system separate from the data warehouse and the query manager is not authorized to make changes to the data source of the data warehouse, and wherein the model data set worksheet is a reusable modeling layer comprising at least a portion of the data source from the data warehouse;
building, by the query manager using the instruction to create the model data set worksheet, a first query statement comprising instructions to generate the model data set worksheet from the portion of the data source from the data warehouse, wherein building the first query statement includes converting the received instruction into model data set worksheet metadata and storing the model data set worksheet metadata local to the query manager;
storing, by the query manager, the first query statement in a schema storage location within the data warehouse, wherein the schema storage location is within the data warehouse and external to the data source from the database;
storing, by the query manager, the model data set worksheet as a table in the schema storage location within the data warehouse in which the first query statement is stored;
servicing a request to create a new worksheet dependent upon the model data set worksheet, including:
retrieving the model data set worksheet from the schema storage location within the data warehouse;
creating, using the model data set worksheet, the new worksheet configured to perform analysis on the portion of the data source from the model data set worksheet, wherein the new worksheet comprises elements that use the portion of the data source from model data set worksheet as input for analysis, and wherein the new worksheet accesses the model data set worksheet as a read-only artifact; and
presenting, on a client computing system, the new worksheet in a view mode that prevents destructive edits and changes to the model data set worksheet and allows additive edits to the model data set worksheet within the new worksheet;
receiving, by the query manager via the spreadsheet interface, an instruction to modify the model data set worksheet;
building, by the query manager using the instruction to modify the model data set worksheet, a second query statement comprising instructions to generate the modified model data set worksheet; and
replacing, by the query manager, the first query statement in the schema storage location within the data warehouse with the second query statement.

2. The method of claim 1, further comprising:
generating, by the query manager, a second query statement targeting the table in the schema storage location within the data warehouse; and
storing, by the query manager, the second query statement in the schema storage location within the data warehouse.

3. The method of claim 2, wherein the first query statement in the schema storage location within the data warehouse is invokable by a standard query language statement, and wherein the table in the schema storage location within the data warehouse is not invokable by a standard query language statement.

4. The method of claim 2, wherein the table in the schema storage location within the data warehouse is updated periodically using the data source from the data warehouse.

5. The method of claim 1, wherein the first query statement is a standard query language statement for a view.

6. The method of claim 1, wherein the query manager has read-write access to the schema storage location within the data warehouse.

7. An apparatus for creating accessible model data sets, the apparatus comprising a computer processor, a computer memory operatively coupled to the computer processor, the computer memory having disposed within it computer program instructions that, when executed by the computer processor, cause the apparatus to carry out:
receiving, by a query manager via a spreadsheet interface, an instruction to create a model data set worksheet using a data source from a database within a data warehouse, wherein the query manager is included in a computing system separate from the data warehouse and the query manager is not authorized to make changes to the data source of the data warehouse, and wherein the model data set worksheet is a reusable modeling layer comprising at least a portion of the data source from the data warehouse;
building, by the query manager using the instruction to create the model data set worksheet, a first query statement comprising instructions to generate the model data set worksheet from the portion of the data source from the data warehouse, wherein building the first query statement includes converting the received instruction into model data set worksheet metadata and storing the model data set worksheet metadata local to the query manager;
storing, by the query manager, the first query statement in a schema storage location within the data warehouse, wherein the schema storage location is within the data warehouse and external to the data source from the database;
storing, by the query manager, the model data set worksheet as a table in the schema storage location within the data warehouse in which the first query statement is stored;
servicing a request to create a new worksheet dependent upon the model data set worksheet, including:
retrieving the model data set worksheet from the schema storage location within the data warehouse;
creating, using the model data set worksheet, the new worksheet configured to perform analysis on the portion of the data source from the model data set worksheet, wherein the dependent worksheet comprises elements that use the portion of the data source from model data set worksheet as input for analysis, and wherein the new worksheet accesses the model data set worksheet as a read-only artifact; and
presenting, on a client computing system, the new worksheet in a view mode that prevents destructive edits and changes to the model data set worksheet and allows additive edits to the model data set worksheet within the new worksheet;

receiving, by the query manager via the spreadsheet interface, an instruction to modify the model data set worksheet;

building, by the query manager using the instruction to modify the model data set worksheet, a second query statement comprising instructions to generate the modified model data set worksheet; and replacing, by the query manager, the first query statement in the schema storage location within the data warehouse with the second query statement.

8. The apparatus of claim 7, wherein the computer program instructions further cause the apparatus to carry out:
generating, by the query manager, a second query statement targeting the table in the schema storage location within the data warehouse; and
storing, by the query manager, the second query statement in the schema storage location within the data warehouse.

9. The apparatus of claim 8, wherein the first query statement in the schema storage location within the data warehouse is invokable by a standard query language statement, and wherein the table in the schema storage location within the data warehouse is not invokable by a standard query language statement.

10. The apparatus of claim 8, wherein the table in the schema storage location within the data warehouse is updated periodically using the data source from the data warehouse.

11. The apparatus of claim 7, wherein the first query statement is a standard query language statement for a view.

12. The apparatus of claim 7, wherein the query manager has read-write access to the schema storage location within the data warehouse.

13. A computer program product for creating accessible model data sets, the computer program product disposed upon a non-transitory computer readable storage medium, the computer program product comprising computer program instructions that, when executed, cause a computer to carry out:
receiving, by a query manager via a spreadsheet interface, an instruction to create a model data set worksheet using a data source from a database within a data warehouse, wherein the query manager is included in a computing system separate from the data warehouse and the query manager is not authorized to make changes to the data source of the data warehouse, and wherein the model data set worksheet is a reusable modeling layer comprising at least a portion of the data source from the data warehouse;
building, by the query manager using the instruction to create the model data set worksheet, a first query statement comprising instructions to generate the model data set worksheet from the portion of the data source from the data warehouse, wherein building the first query statement includes converting the received instruction into model data set worksheet metadata and storing the model data set worksheet metadata local to the query manager;

storing, by the query manager, the first query statement in a schema storage location within the data warehouse, wherein the schema storage location is within the data warehouse and external to the data source from the database;

storing, by the query manager, the model data set worksheet as a table in the schema storage location within the data warehouse in which the first query statement is stored;

servicing a request to create a new worksheet dependent upon the model data set worksheet, including:
retrieving the model data set worksheet from the schema storage location within the data warehouse;
creating, using the model data set worksheet, the new worksheet configured to perform analysis on the portion of the data source from the model data set worksheet, wherein the dependent worksheet comprises elements that use the portion of the data source from model data set worksheet as input for analysis, and wherein the new worksheet accesses the model data set worksheet as a read-only artifact; and
presenting, on a client computing system, the new worksheet in a view mode that prevents destructive edits and changes to the model data set worksheet and allows additive edits to the model data set worksheet within the new worksheet;

receiving, by the query manager via the spreadsheet interface, an instruction to modify the model data set worksheet;

building, by the query manager using the instruction to modify the model data set worksheet, a second query statement comprising instructions to generate the modified model data set worksheet; and replacing, by the query manager, the first query statement in the schema storage location within the data warehouse with the second query statement.

14. The computer program product of claim 13, wherein the computer program instructions further cause the computer to carry out:
generating, by the query manager, a second query statement targeting the table in the schema storage location within the data warehouse; and
storing, by the query manager, the second query statement in the schema storage location within the data warehouse.

15. The computer program product of claim 14, wherein the first query statement in the schema storage location within the data warehouse is invokable by a standard query language statement, and wherein the table in the schema storage location within the data warehouse is not invokable by a standard query language statement.

16. The computer program product of claim 14, wherein the table in the schema storage location within the data warehouse is updated periodically using the data source from the data warehouse.

17. The computer program product of claim 13, wherein the first query statement is a standard query language statement for a view.

* * * * *